(12) United States Patent
Szymczak et al.

(10) Patent No.: US 12,502,950 B2
(45) Date of Patent: Dec. 23, 2025

(54) ISOLATOR FOR MOUNTING A HEAT EXCHANGER

(71) Applicant: VALEO SYSTEMES THERMIQUES, La Verriere (FR)

(72) Inventors: Matt Szymczak, Auburn Hills, MI (US); Matthew C. Windell, Greensburg, IN (US)

(73) Assignee: Valeo Systemes Thermiques, La Verriere (FR)

( * ) Notice: Subject to any disclaimer, the term of this patent is extended or adjusted under 35 U.S.C. 154(b) by 196 days.

(21) Appl. No.: 18/459,987

(22) Filed: Sep. 1, 2023

(65) Prior Publication Data

US 2025/0074184 A1    Mar. 6, 2025

(51) Int. Cl.
*F16M 13/00* (2006.01)
*B60K 11/04* (2006.01)

(52) U.S. Cl.
CPC .................................. *B60K 11/04* (2013.01)

(58) Field of Classification Search
CPC ..................................................... B60K 11/04
See application file for complete search history.

(56) References Cited

U.S. PATENT DOCUMENTS

| | | | | |
|---|---|---|---|---|
| 3,229,026 | A * | 1/1966 | Sulzer | H02G 3/0616 174/664 |
| 5,335,893 | A * | 8/1994 | Opp | B64C 1/066 403/228 |
| 6,490,947 | B2 * | 12/2002 | Burger | F16C 1/262 74/502.6 |
| 7,261,365 | B2 * | 8/2007 | Dickson | B60G 99/002 296/190.07 |
| 2013/0243526 | A1 * | 9/2013 | Williamson | A47L 11/4097 405/271 |

FOREIGN PATENT DOCUMENTS

CN    205142751 U    4/2016

* cited by examiner

*Primary Examiner* — Amy J. Sterling
(74) *Attorney, Agent, or Firm* — Valeo Systemes Thermiques

(57) ABSTRACT

An isolator for mounting a heat exchanger is disclosed. The isolator includes a body made of an elastic material, and a core made of non-elastic material. The core is encompassed by the body and includes a through-hole extending along a central axis. The body has a mounting slot extending perpendicular to the central axis. The body has a non-circular cross-section when viewed along the central axis.

18 Claims, 4 Drawing Sheets

SECTION A:A

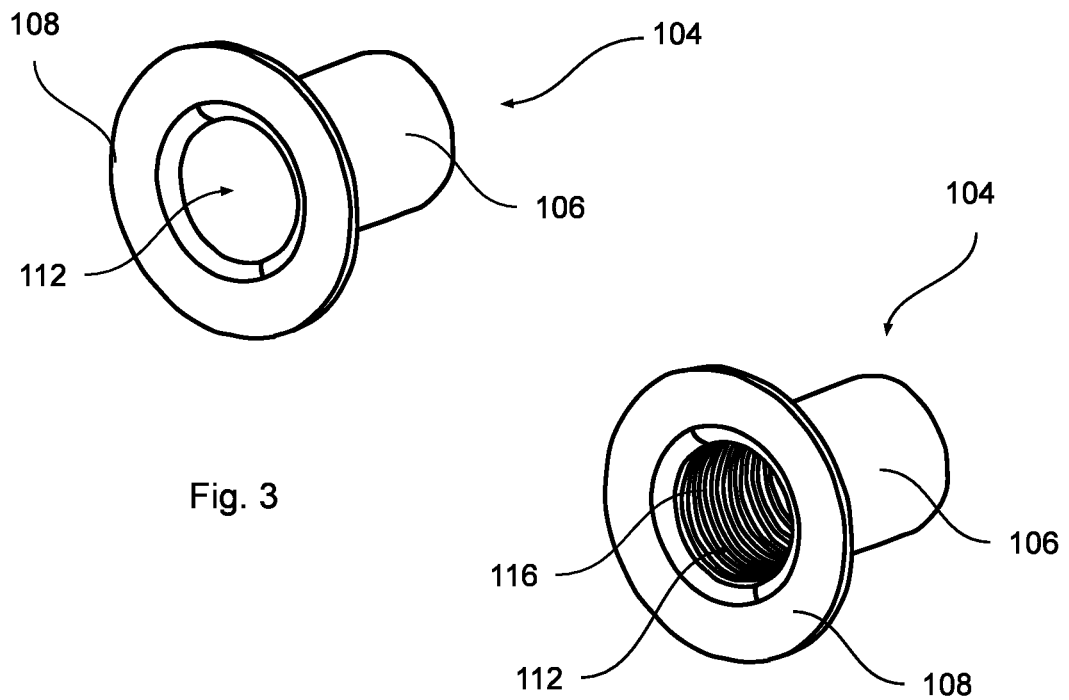
Fig. 3
Fig. 4
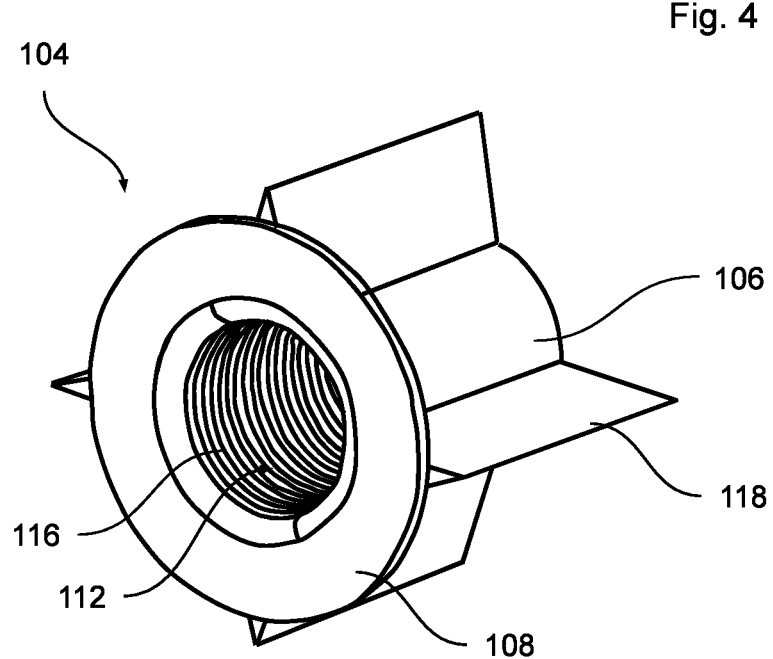
Fig. 5

ISOLATOR FOR MOUNTING A HEAT EXCHANGER

TECHNICAL FIELD

The present invention relates to mounting of heat exchangers in vehicles. More particularly, it pertains to an isolator for mounting a heat exchanger to a frame of the vehicle.

BACKGROUND OF THE INVENTION

As is well known that thermal management systems are used in vehicles for maintaining temperature within a certain range of components like powertrains, battery packs and other heat generating components of the vehicle, such as electric vehicles and hybrid-electric vehicles, as these components operates efficiently within a specified operating temperature range. Such a thermal management system cools the powertrain and/or the battery pack by extracting excess heat form these components. Deviation of temperature of the powertrain and the battery pack from the specified temperature range can impede performance and reduce efficiency and durability of these components.

The thermal management system includes heat exchangers such as a radiator, chiller, and the like. The heat exchangers are secured to structures of the vehicle at a certain location using fasteners and isolators. In some cases it has been observed that the radiator of the vehicle is secured to a frame/structure of the vehicle though a fastener, such as a threaded bolt, which extends through the vehicle frame and an isolator configured in a mounting bracket of the radiator, and further screwed to the mounting bracket directly, that makes a direct connection/contact between the radiator and the fastener. This direct contact between the radiator and the fastener creates a high risk of transferring vibration and loads directly to the radiator, which may cause failure of the radiator.

Therefore, there is a need for a simple, robust and cost-effective arrangement to eliminate direct contact between the heat exchanger and the mounting frame of the vehicle.

BRIEF SUMMARY OF THE INVENTION

The present invention discloses an improved isolator for mounting a heat exchanger to a frame of the vehicle. The proposed isolator allows a mounting fastener, such as a threaded bolt, to be screwed into the isolator to avoid direct contact between the heat exchanger and the fastener, thereby safely isolating the heat exchanger from the vehicle frame.

According to an aspect of the present invention, the disclosed isolator includes a body made of an elastic material, and a core made of non-elastic material. The core is encompassed by the body and having a through-hole extending along a central axis. The body has a mounting slot extending perpendicular to the central axis. The mounting slot encircles the core. Besides, the body has a non-circular cross-section when viewed along the central axis.

In an embodiment, the core can include a protrusion extending radially away from the central axis within the body.

In another embodiment, the core can include a plurality of protrusions extending radially away from the central axis within the body.

In an embodiment, the cross-section of the body can be of substantially rectangular shape.

In another embodiment, the cross-section of the body can be of substantially square shape.

In an embodiment, outside edges of the body can be rounded.

In another embodiment, the outside edges of the body can be chamfered.

In an embodiment, the through-hole of the core can be at least partially threaded.

In an embodiment, the core can include an external element protruding outside of and away from the body along the central axis. The through-hole is extended through the external element.

In addition, the through-hole at a section extending through the external element is at least partially threaded.

Besides, the external element can be a hexagon with an axis of symmetry coaxial with the central axis.

Further, the body can be made of rubber.

Furthermore, the core can be made of steel or aluminum.

In another aspect, the present invention discloses a heat exchanger module including a heat exchanger with a bracket, a structural module component with an opening, and an isolator. The isolator includes a body made of an elastic material and a core made of non-elastic material. The core is encompassed by the body and having a through-hole extending along a central axis. The body has a mounting slot extending perpendicular to the central axis. Besides, the body has a non-circular cross-section when viewed along the central axis.

In addition, the bracket is configured to receive the isolator so that the mounting slot is engaged by a portion of the bracket. Further, the heat exchanger is attached to the structural module component with a connector extending through the opening of the structural module component and the through-hole of the isolator placed in the bracket.

Furthermore, with the through-hole of the core being at least partially threaded, the connector is also at least partially threaded and thereby in a threaded connection with the core of the isolator.

In an embodiment, the bracket and the isolator can be in a form fitting connection.

Besides, the heat exchanger is isolated from the structural module component through the isolator, without any other contact therebetween.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

FIG. 3 illustrates a core of the isolator of FIG. 1;

FIG. 4 illustrates the core with internal threads;

FIG. 5 illustrates the core with internal threads and external protrusions;

DETAILED DESCRIPTION OF THE INVENTION

Figure 1:
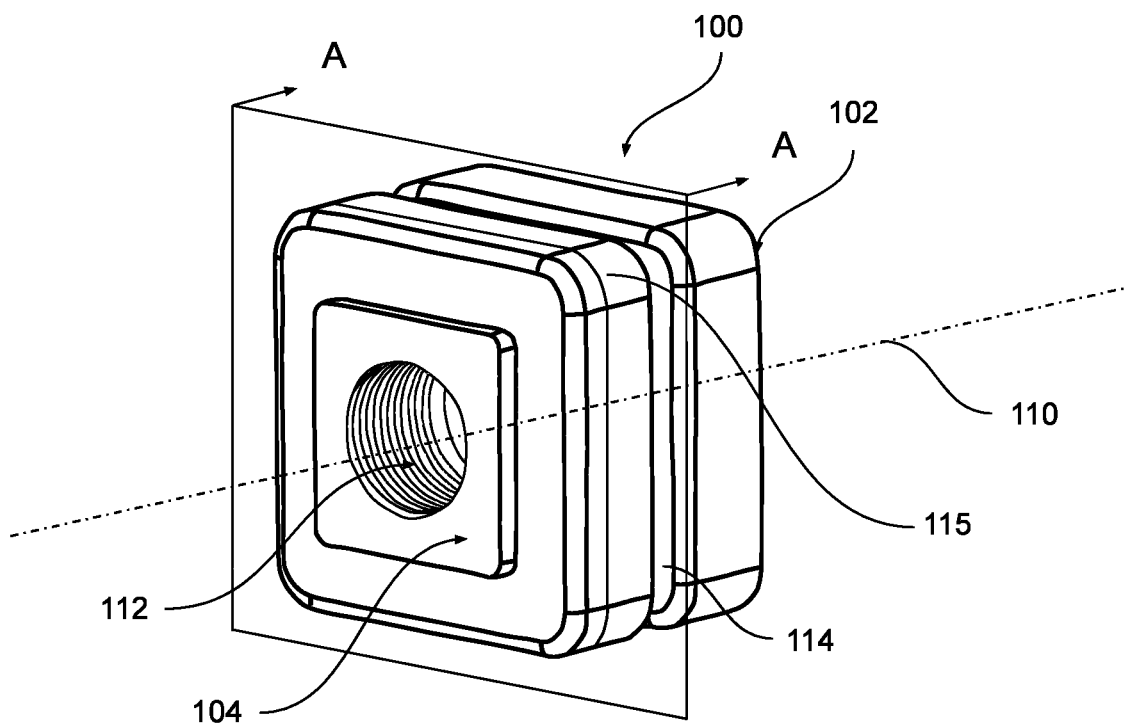
FIG. 1 illustrates an isometric view of an isolator in accordance with an embodiment of the present invention.
Figure 2:
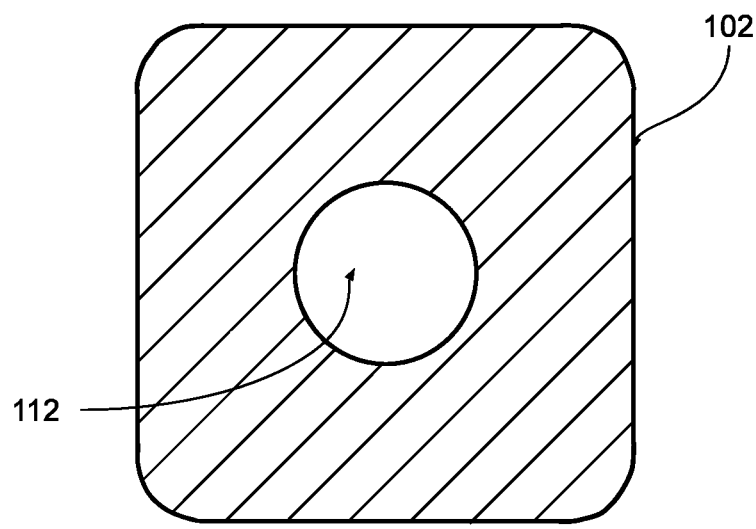
FIG. 2 illustrates a sectional view of the isolator of FIG. 1.

It must be noted that the figures disclose the invention in a detailed enough way to be implemented, said figures helping to better define the invention if needs be. The invention should however not be limited to the embodiment disclosed in the description.

The present invention is explained in the forthcoming description and the accompanying drawings with an example of an improved and reliable isolator for mounting a heat exchanger to a structural module component such as a frame of a vehicle. While mounting the heat exchanger, the proposed isolator is fitted in a bracket of the heat exchanger and allows a threaded mounting fastener, extending through the frame and the isolator, to be screwed into the isolator to avoid direct contact between the heat exchanger and the fastener, thereby safely isolating the heat exchanger from the vehicle frame which in turn avoiding risk of direct transferring vibration and loads to the heat exchanger from the frame.

It is to be appreciated that the present invention is explained with an example of an isolator for mounting a heat exchanger of a vehicle, however the concept of the present invention is applicable for any other application in vehicular and non-vehicular environment, where it is required to use the isolator for mounting any article, and all such applications are within scope of the present invention without any limitations whatsoever.

Referring to FIGS. 1, 2, 3, 4 and 5, in accordance with an embodiment, the present invention discloses an isolator 100 including a body 102 made of an elastic material and a core 104 made of non-elastic material. A portion of the core 104 is received within a hole (not shown) extending along a length of the body 102. In an embodiment, the core 104 can be a hollow member, like a sleeve, including a shank portion 106, a head portion 108 at one end of the shank portion 106, and a through-hole 112 extending, along a central axis 110, through the shank portion 106 and the head portion 108. The shank portion 106 is encompassed by the body 102, and the head portion 108 is projected outside of the body 102 and abuts with adjacent outer surface of the body 102. The head portion 108 can be as a flange protruded from the end of the shank portion 106.

In addition, the body 102 includes a mounting slot 114 extending perpendicular to the central axis 110. The mounting slot 114 encircles the core 104. For instance, the body 102 can be of dumbbell shape. Besides, the body 102 has a non-circular cross-section when viewed along the central axis 110. In an embodiment, the cross-section of the body 102 can be of substantially square shape.

In another embodiment, the cross-section of the body 102 can be of substantially rectangular shape (not shown).

In an embodiment, outside edges 115 of the body 102 can be rounded.

In another embodiment, the outside edges 115 of the body 102 can be chamfered (not shown).

Further, the body can be made of rubber.

In an embodiment, the through-hole 112 of the core 104 can be at least partially threaded with internal treads 116, i.e., at least a portion of the inner surface of the core 104 has internal threads 116, as shown in FIG. 4 and FIG. 5.

In addition, the core 104 can include one or more protrusions, such as protrusions 118, protruded from the shank portion 106 and extending radially away from the central axis 110. The protrusions 118 can be like barbs to engage with the inner surface of the body 102. The engagement between the protrusions 118 and the body 102 can prevent rotation of the core 104 within the body 102 even when a torque is applied on the core 104 and/or the body 102. For instance, a portion of the protrusions 118 may pierce within the body 102.

In an embodiment, the core 104 can be made of steel or aluminum.

Figure 6:
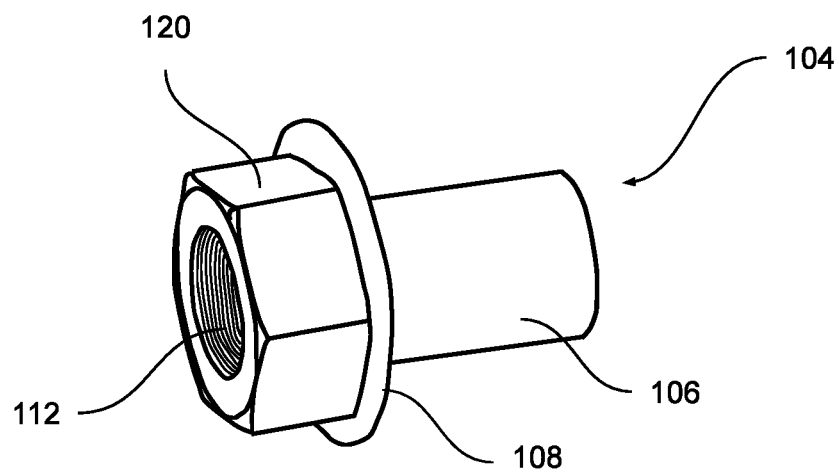
FIG. 6 illustrates a core having an external element.
Figure 7:
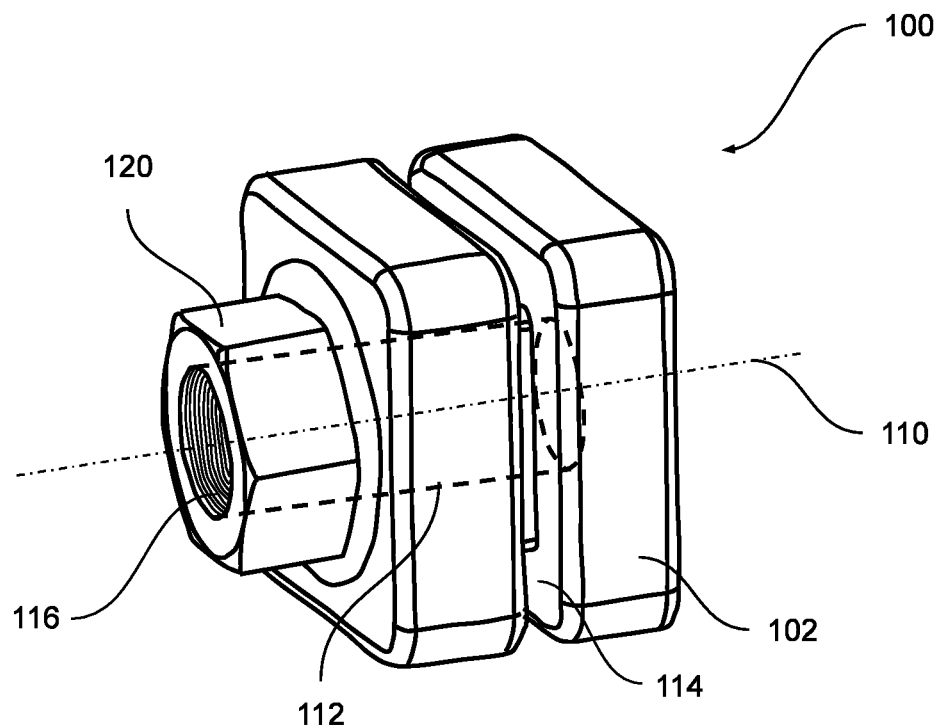
FIG. 7 illustrates the isolator with the core of FIG. 6.

Referring to FIG. 6 and FIG. 7, in an embodiment, the core 104 can include an external element 120 coupled to the head portion 108. For instance, the external element 120 can be coupled to the head portion 108 through brazing and/or welding. The external element 120 is protruded outside of and away from the body 102 along the central axis 110 when the shank portion 106 is received in the body 102. The through-hole 112 is extended through the external element 120. In addition, the through-hole 112 at a section extending through the external element 120 is at least partially threaded with the internal threads 116.

In an embodiment, the external element 120 can be a hexagon with an axis of symmetry coaxial with the central axis 110.

In another embodiment, the external element 120 can be of any suitable shape, such as square shape, disc shape, triangular shape, or any other suitable polygon shape.

In another embodiment, the external element 120, the head portion 108, and the shank portion 106 can be integral single part.

Figure 8:
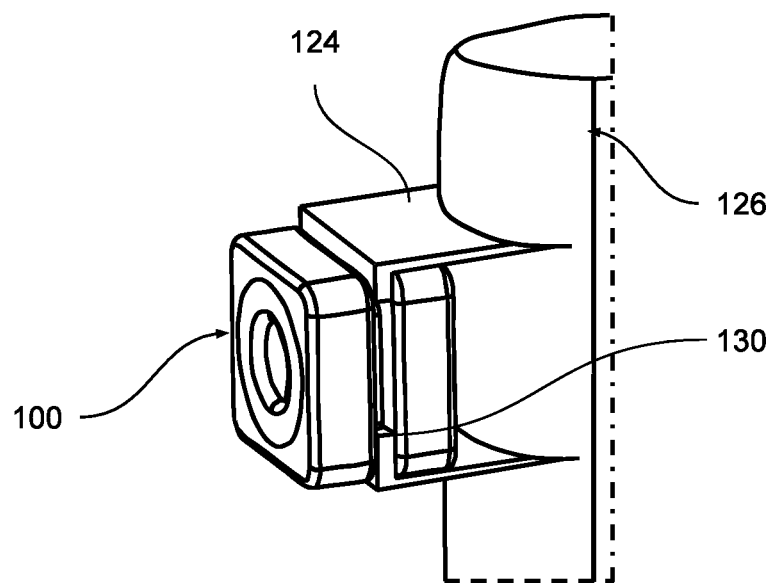
FIG. 8 illustrates the isolator fitted in a bracket of a heat exchanger.
Figure 9:
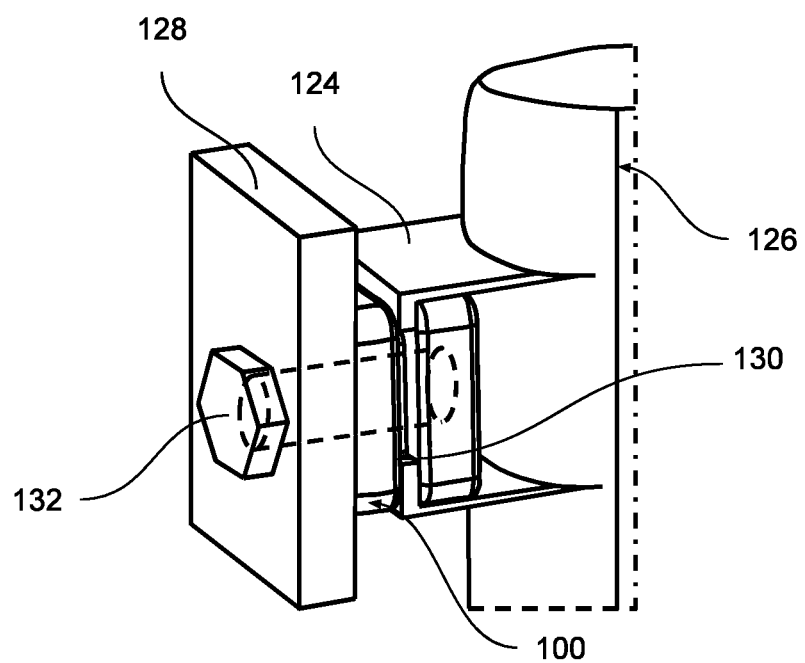
FIG. 9 illustrates mounting of the heat exchanger to a structural module component.

Referring to FIG. 8 and FIG. 9, the isolator 100 is configured in a bracket 124 of a heat exchanger 126 to be mounted to a structural module component 128. For instance, the structural module component 128 can be a frame of a vehicle. The mounting slot 114 of the body 102 can have a profile smaller or equal to an insertion groove/notch 130 provided in the bracket 124. In addition, when the isolator 100 is received in the bracket 124 through the insertion groove/notch 130, the mounting slot 114 is engaged by a portion, adjacent to the slot 114, of the bracket 124. Besides, the bracket 124 and the isolator 100 can be in a form fitting connection.

In addition, with non-circular cross-section, for instance square cross-section, of the body 102, the body 102 can easily slide into the groove/notch 130 provided in the bracket 124 and prevents rotation of the isolator 100 in the bracket 124.

In addition, the heat exchanger 126 is attached to the structural module component 128 with a connector 132. A portion of the connector 132 extends through the opening (not shown) of the structural module component 128 and the through-hole 112 of the isolator 100 placed in the bracket 124. For instance, the connector 132 can be threaded bolt having external treads. In addition, the external threads of the connector 132 engage with the internal threads 116 of the core 104, thereby forming a threaded connection therebetween. Besides, as the connector 132 is screwed to the core 104, the heat exchanger 126 is isolated from the structural module component 128 through the isolator 100, without any other contact therebetween.

In any case, the invention cannot and should not be limited to the embodiments specifically described in this document, as other embodiments might exist. The invention shall spread to any equivalent means and any technically operating combination of means.

The invention claimed is:

1. An isolator for mounting a heat exchanger, comprising:
a body made of an elastic material; and
a core made of non-elastic material, the core being encompassed by the body and having a through-hole extending along a central axis;
wherein the core includes a plurality of protrusions extending radially away from the central axis within the body;
wherein the body has a mounting slot extending perpendicular to the central axis, and
wherein the body has a non-circular cross-section when viewed along the central axis.

2. The isolator according to claim 1, wherein the mounting slot encircles the core.

3. The isolator according to claim 1, wherein the cross-section of the body is of substantially rectangular shape.

4. The isolator according to claim 3, wherein outside edges of the body are rounded.

5. The isolator according to claim 3, wherein outside edges of the body are chamfered.

6. The isolator according to claim 3, wherein the cross-section is of substantially square shape.

7. The isolator according to claim 1, wherein the through-hole is at least partially threaded.

8. The isolator according to claim 1, wherein the core includes an external element protruding outside of and away from the body along the central axis.

9. The isolator according to claim 8, wherein the through-hole extends through the external element.

10. The isolator according to claim 8, wherein the through-hole at a section extending through the external element is at least partially threaded.

11. The isolator according to claim 8, wherein the external element is a hexagon with an axis of symmetry coaxial with the central axis.

12. The isolator according to claim 1, wherein the body is made of rubber.

13. The isolator according to claim 1, wherein the core is made of steel or aluminum.

14. A heat exchanger module comprising:
a heat exchanger with a bracket;
a structural module component with an opening; and
an isolator including:
a body made of an elastic material; and
a core made of non-elastic material, the core being encompassed by the body and having a through-hole extending along a central axis,
wherein the body has a mounting slot extending perpendicular to the central axis, and wherein the body has a non-circular cross-section when viewed along the central axis,
wherein the bracket is configured to receive the isolator so that the mounting slot is engaged by a portion of the bracket, and wherein the heat exchanger is attached to the structural module component with a connector extending through the opening of the structural module component and the through-hole of the isolator placed in the bracket.

15. The heat exchanger module according to claim 14, with the through-hole of the core being at least partially threaded, wherein the connector is also at least partially threaded and thereby in a threaded connection with the core of the isolator.

16. The heat exchanger module according to claim 14, wherein the bracket and the isolator are in a form fitting connection.

17. The heat exchanger module according to claim 14, wherein the heat exchanger is isolated from the structural module component through the isolator, without any other contact therebetween.

18. The heat exchanger module according to claim 14, wherein the core includes one or more protrusions extending radially away from the central axis within the body.

* * * * *